United States Patent [19]

Fletcher et al.

[11] 4,055,810
[45] Oct. 25, 1977

[54] INDEPENDENT GAIN AND BANDWIDTH CONTROL OF A TRAVELING WAVE MASER

[76] Inventors: James C. Fletcher, Administrator of the National Aeronautics and Space Administration, with respect to an invention of David L. Trowbridge, Sunland, Calif.

[21] Appl. No.: 708,796

[22] Filed: July 26, 1976

[51] Int. Cl.² .............................................. H01S 1/02
[52] U.S. Cl. .......................................... 330/4; 332/7.5
[58] Field of Search ................. 330/4; 332/7.5; 331/94

[56] References Cited

U.S. PATENT DOCUMENTS

| | | | |
|---|---|---|---|
| 3,023,366 | 2/1962 | Chester et al. | 330/4 |
| 3,023,367 | 2/1962 | Bolef et al. | 330/4 |
| 3,200,356 | 8/1965 | Okwit | 332/7.5 |
| 3,213,382 | 10/1965 | Hensel | 330/4 |
| 3,541,486 | 11/1970 | DeLuca et al. | 330/4 |
| 3,676,787 | 7/1972 | Low et al. | 330/4 |
| 3,978,417 | 8/1976 | Fletcher et al. | 331/94 |

FOREIGN PATENT DOCUMENTS 254,446  9/1964  Australia ................................. 330/4

OTHER PUBLICATIONS

Thornbury et al., "Study and Investigation of an Improved Protan Maser Antenna," 10/66, pp. 1-81.

*Primary Examiner*—Nelson Moskowitz
*Attorney, Agent, or Firm*—Monte F. Mott; Paul F. McCaul; John R. Manning

[57] ABSTRACT

An X-band traveling wave maser of the folded-comb type is provided with two figure-eight coils for gain and bandwidth control. One figure-eight coil covers the full length of the comb structure for bandwidth adjustment of an external magnetic field. The other figure-eight coil covers a central half of the comb structure for independent gain adjustment of the external magnetic field. The half of each figure-eight coil at the turn around end of the comb structure is oriented to aid the external magnetic field, and the half of each figure-eight coil at the input-output end of the comb structure is oriented to buck the external magnetic field. The maser is pumped in the push-push mode with two different frequencies.

12 Claims, 5 Drawing Figures

INDEPENDENT GAIN AND BANDWIDTH CONTROL OF A TRAVELING WAVE MASER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

This invention relates to microwave solid-state masers, and more particularly to improved bandwidth and gain control of a traveling-wave maser amplifier.

The instantaneous bandwidth of a maser is determined by the maser material linewidth, the shape (or uniformity) of the magnetic field required for maser operation, and the electronic gain at which the maser operates. A thorough discussion of methods for increasing the bandwidth of a maser can be found in *Microwave Solid State Masers* by S. E. Siegman, McGraw-Hill Book Co., Inc., pp. 326-331, 395. Siegman shows that operation of a maser using ruby (linewidth $\simeq$ 50 MHz) in a uniform magnetic field at high gain (more than 40 dB) results in a 3-dB bandwidth of less than 20 MHz. Attempts to increase bandwidth always result in substantial gain reductions.

Considerable effort has been devoted to the task of optimizing the gain versus bandwidth trade-off. Bandwidth and gain value adjustment of previous masers has been achieved by a combination of iron shims and field staggering coils to alter the shape of the magnetic field required for the maser operation.

The previous methods are time consuming and require different shims or field staggering coil placement for each maser structure. Nevertheless, stagger tuning remains the most efficient way to adjust the gain and bandwidth of a maser. What is required is a method for effectively achieving stagger tuning without the need for altering the placement of shims or field staggering coils. Ideally, the method employed should permit tuning after assembly of the maser has been completed, and even after the maser has been installed in the system in which it is operate. It should also permit tuning a maser of some basic design for operation in different systems without altering its design.

OBJECTS AND SUMMARY OF THE INVENTION

An object of this invention is to provide external control of gain and bandwidth of a solid-state, traveling-wave maser amplifier.

A further object is to provide for independent control of bandwidth and gain of a traveling-wave maser amplifier.

These and other objects of the invention are achieved in a folded-comb traveling-wave maser by a set of two magnetic field shaping figure-eight coils, one figure-eight coil covering the full length of the comb structure for bandwidth adjustment, and another figure-eight coil covering a central half of the comb structure for independent gain adjustment.

DC current through the separate coils is separately controlled by separate adjustable regulated DC current sources. The external magnetic field of the maser is provided by a superconducting electromagnet and is substantially uniform throughout the length of the comb structure. One side of each of the bandwidth and gain control figure-eight coils at the turn-around end of the comb structure is oriented to aid the external magnetic field. The other side of each of control figure-eight coils at the input-output end of the comb structure is oriented to buck the external magnetic field. Independent adjustment of the bandwidth and gain control magnetic currents thus provides independent adjustment of bandwidth and gain for optimum operation with minimum circuit losses.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
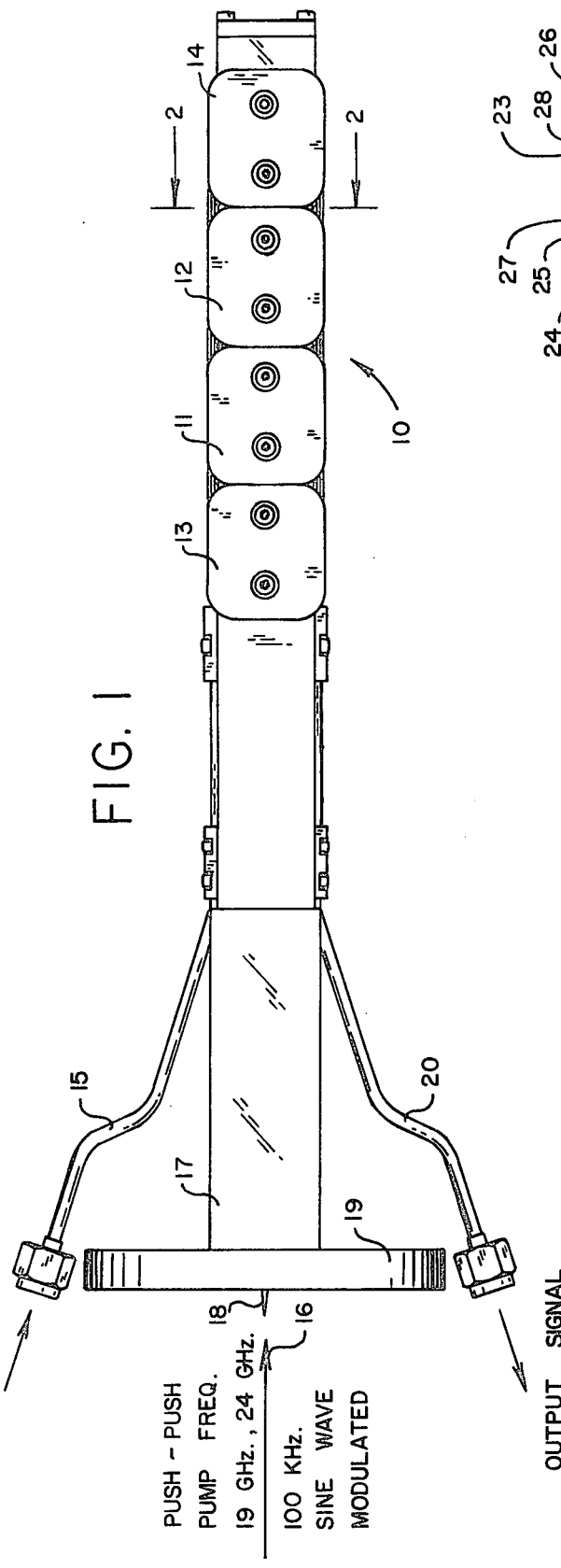
FIG. 1 is a bottom view of a traveling-wave maser of the folded-comb type showing two figure-eight field shaping coils wound on bobbins mounted on the outside of the structure.
Figure 2:
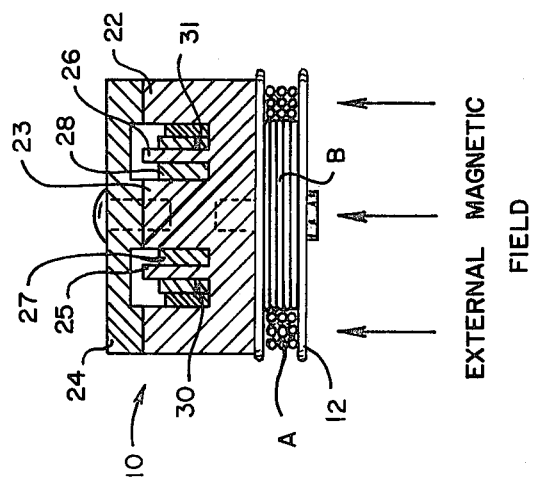
FIG. 2 is a sectional view of the structure of FIG. 1.

Referring now to FIG. 1 of the drawings, there is shown a high-gain, broadband traveling-wave maser (TWM) in which gain is provided by a unitary comb and waveguide structure 10, and bandwidth is improved by stagger tuning sections as disclosed in U.S. Pat. No. 3,486,123. However, the stagger tuning structure disclosed in that patent is replaced by two figure-eight coils A and B wound on bobbins 11, 12, 13 and 14 secured to the bottom of the waveguide structure 10 as shown in FIG. 2 for the bobbin 12 at the turn-around end of the folded TWM.

An X-band input signal (e.g., 8.4 GHz) is coupled into the TWM by a coaxial transmission line 15 and amplified by the TWM operated in a push-push pump mode by a source of pumping energy at two frequencies represented by an arrow 16 (e.g., 19 GHz and 24 GHz pump frequencies). The pump energy is coupled into the folded-comb structure of the TWM by a bifurcated waveguide section 17 which evenly divides energy at both frequencies into each half of the waveguide. A dielectric partition having a knife edge 18 protruding from a mounting flange 19 assures that energy at both frequencies is coupled to each side. The amplified signal out of the return side of the folded-comb structure is coupled out through a coaxial transmission line 20.

The folded-comb structure is similar to that shown in U.S. Pat. No. 3,676,787. FIG. 2 is analogous to the sectional view shown in that patent. The waveguide structure 10 is comprised of a main body 22 with dividing wall 23 and a cover 24. The folded-comb structure, formed as a unitary part of the main body on each side of the dividing wall, is comprised of spaced apart fingers 25 on one side and spaced apart fingers 26 on the other side. Slabs 27 and 28 of active ruby crystal are disposed between the comb fingers and the dividing wall on each side. Square slabs of polycrystalline yttrium-iron-garnet (YIG) 30 and 31 are supported at an appropriate height along the outside of the comb fingers. Alumina strips are used to support and secure the YIG slabs in place and provide dielectric loading for desired frequency adjustment of waveguide structure. The active ruby is cut so that its C axis is perpendicular to the direction of the magnetic field represented by arrows outside the main body 10 in FIG. 2.

The coupling of input and output signals to and from the comb structure, and around the end of the comb structure, is provided in a conventional manner utilizing preshaped coupling probes placed near the end fingers of the combs. In the case of coupling around the end of the comb structure, the probe is essentially U-shaped with each arm placed near the end finger of a different one of the combs.

As noted hereinbefore, the instantaneous bandwidth of a maser is determined by the maser material linewidth, the shape of the magnetic field required for maser operation, and the gain at which the maser operates. A maser using ruby (linewidth $\simeq$ 50 MHz)in a uniform magnetic field (nominal field strength $\simeq$ 4945G) at high gain (more than 40 dB) results in a 3dB bandwidth of less than 20 MHz. Bandwidth and gain adjustments in such a maser have heretofore been made in accordance with the teachings of the aforesaid U.S. Pat. No. 3,486,123, using iron shims and field staggering coils, but any attempts to increase bandwidth has always resulted in substantial gain reductions, and viceversa, so that for each application, it was very time consuming to optimally adjust bandwidth and gain values for particular operating requirements. The present invention employs only two figure-eight coils A and B wound on the bobbins 11–14 to achieve a field strength and frequency amplification distribution shown diagramatically in FIG. 3 over the full length of the folded-comb structure. The ruby crystals 27 and 28 shown together with the comb fingers 25 and 26 in FIG. 3 indicate the orientation of the figure-eight coils wound on the bobbins.

Figure 3:
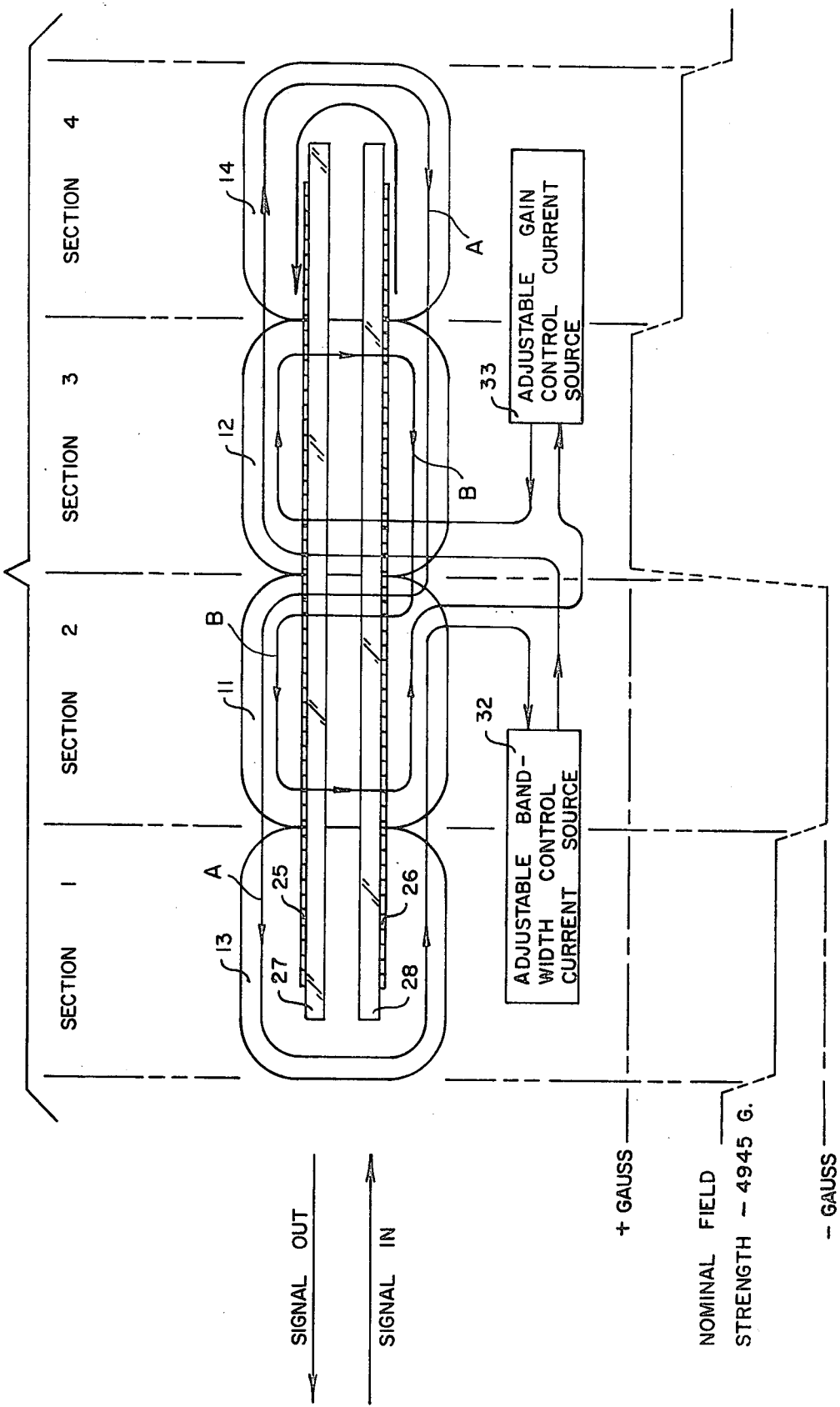
FIG. 3 illustrates diagramatically the field shape achieved with two figure-eight field shaping coils disposed relative to the folded-comb structure of the traveling-wave maser of FIG. 1.

One set of half-size coils are wound separately on the bobbins 11, and 12, and then interconnected to form a figure-eight coil B as shown schematically in FIG. 3. The resulting half-size figure-eight coil B is used for gain adjustment. A set of full-size coils are wound separately, one around bobbins 11 and 13, and one around bobbins 12 and 14. The full-size set of coils thus wound are then interconnected to form a figure-eight coil A as shown in FIG. 3. This full-size figure-eight coil A is used for bandwidth adjustment.

The terms full-size and half-size as applied to the figure-eight coils A and B, respectively are relative to the length of the active maser region, namely the folded-comb structure. As applied to the figure-eight coil A for bandwidth adjustment, the term clearly implies that it covers the full length of the comb structure. Thus, each separate coil of the figure-eight coil is aptly described as full-size, even though each covers only half of the comb structure. The same reasoning applies to the half-size figure-eight coil B which covers only the central half of the comb structure.

The half- and full-size coils wound aroung bobbins 11 and 13 are oriented to produce an electromagnetic field which aids (increases) the external magnetic field, while the half- and full-size coils wound around bobbins 12 and 14 are oriented to produce an electromagnetic field which bucks (decreases) the external magnetic field. The net field strength distribution over the total length of the full-size figure-eight coil is shown in FIG. 3.

The gain and bandwidth values of the TWM are independently adjusted by setting the currents in the half-size and full-size figure-eight coils separately through respective bandwidth control and gain control current sources 32 and 33. These may be remotely situated (typically 300 or 400 feet away) for ease in adjusting the current levels. Alternatively, the current sources may be situated closer to the TWM and remotely controlled by a signal through a suitable communication link. In either case, the TWM can be maintained at a very low (liquid helium) operating temperature while the current adjustments are made for optimum bandwidth and gain.

From the field strength distribution of FIG. 3, it is evident that the field strengths in sections 1 to 4 of the maser are adjusted by the bandwidth control current source. The field strengths in sections 2 and 3 are then set by the gain control current source. In both cases the current sources may be remote from the TWM, or at least external to the TWM.

Figure 4:
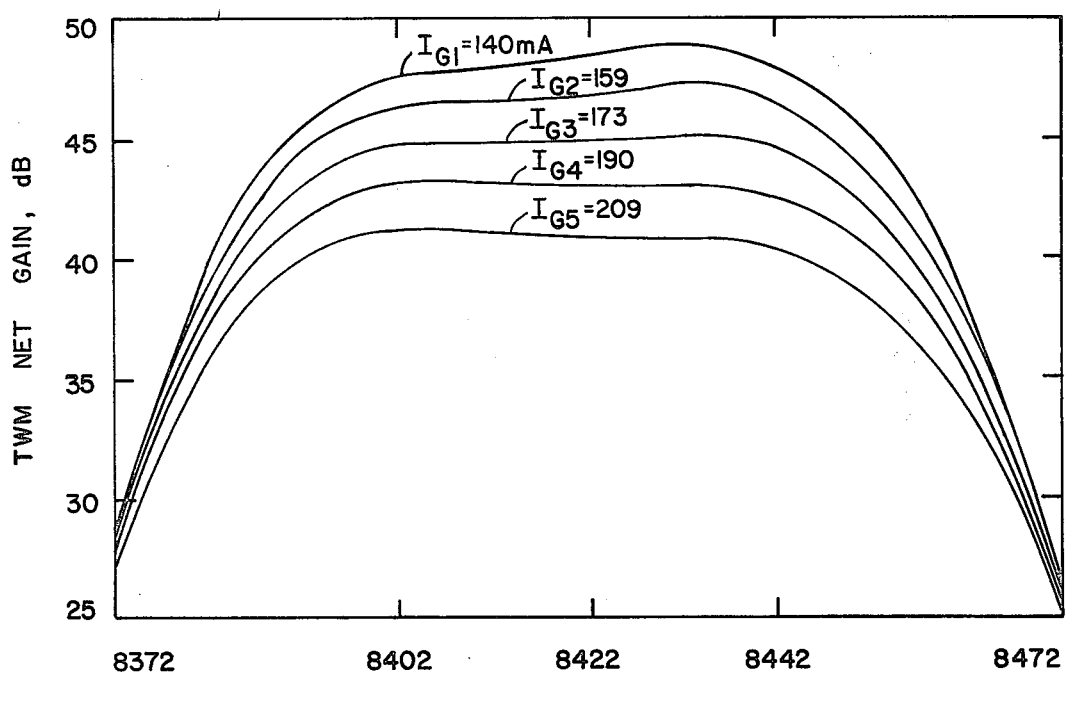
FIG. 4 shows gain versus frequency at five gain current control settings achieved with the structure of FIG. 1.

FIG. 4 shows gain as a function of frequency at five gain current control values $I_{G1}$ through $I_{G5}$. This demonstrates that the gain can be adjusted within reasonable limits ($\pm$3dB at 45dB gain) without significantly changing the bandwidth. The result is minimal change in the phase and group delay characteristics of the maser as gain is adjusted.

Figure 5:
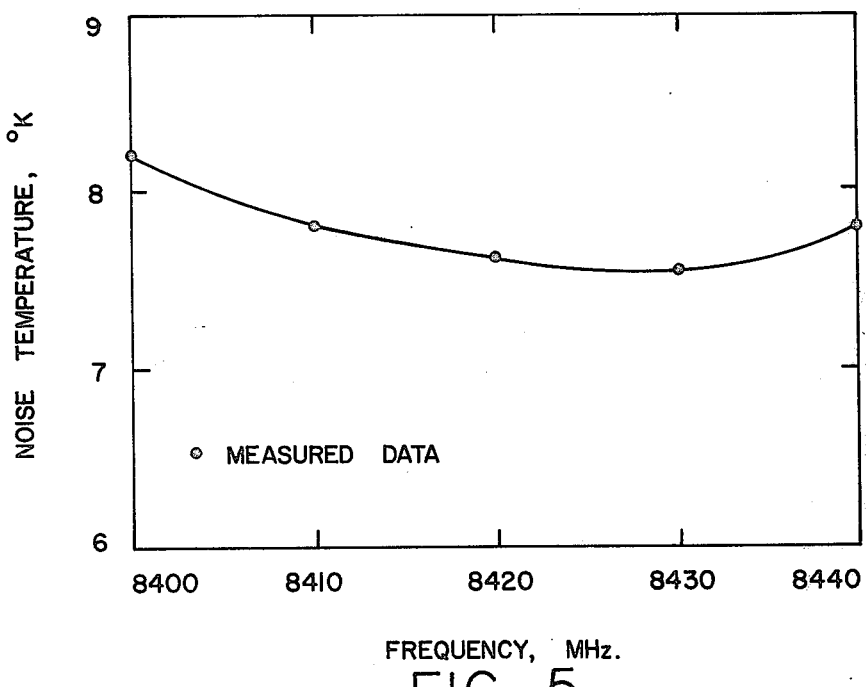
FIG. 5 shows noise temperature versus frequency achieved with the structure of FIG. 1.

This field staggering technique improves the noise performance across the maser bandpass by minimizing slow-wave circuit losses prior to signal amplification. All signal frequencies are given some amplification as early as possible in the traveling-wave maser structure by providing several repeated cycles of field stagger tuning along the maser's total length. The result is an X-band maser having a relatively flat equivalent noise temperature vs. frequency performance as shown in FIG. 5. To achieve the required gain over the extra wide bandwidth, the pump frequency requires modulation, e.g., with a 100 KHz sinewave with 26V peak to peak output as suggested in FIG. 1.

From the foregoing it is evident that the use of two figure-eight wound coils for field shaping achieves independent control of maser bandwidth and gain, and minimizes circuit losses by efficiently broadening the maser material linewidth in a manner which results in lower noise temperature over the maser bandwidth. Although only one particular embodiment of the invention has been described and illustrated, it is recognized that modifications and equivalents may readily occur to those skilled in the art. Consequently, it is intended that the claims be interpreted to cover such modifications and equivalents.

What is claimed is:

1. In a traveling wave solid-state maser having a folded-comb structure with an input-output end and a turn-around end, said maser being designed for operation in a push-push pump mode using separate pump frequencies, and said maser having an external magnetic field that is uniform across the full length of the folded comb structure, the combination comprising:

an adjustable electromagnetic means for aiding said uniform external field to a desired bandwidth control level over half the length of said folded comb structure at a turn-around end thereof;

an adjustable electromagnetic means for bucking said uniform external field to said desired bandwidth control level over half the length of said folded comb structure at an input-output end thereof;

an adjustable electromagnetic means for further aiding said uniform external field to a desired gain control level over one quarter of the length of said folded comb structure from substantially the center of said folded comb structure out toward said turn around; and an adjustable electromagnetic means for further bucking said uniform external field to said desired gain control level over one quarter of the length of said folded comb structure from substantially the center of said folded comb structure back toward said input-output end.

2. The combination as defined in claim 1 wherein said traveling wave maser is designed for X-band operation.

3. The combination as defined in claim 2 wherein said separate pump frequencies are modulated.

4. The combination as defined in claim 3 wherein said maser is operated to amplify an input signal at about 8.4 GHz, and said separate pump frequencies are selected to be about 19 GHz and 24 GHz.

5. The combination as defined in claim 4 wherein said separate pump frequencies are modulated with a 100 KHz sinewave.

6. In combination with a traveling wave maser of the folded comb type having an input-output end and a turn-around end, and having an external magnetic field that is uniform across the full length of the folded comb structure, a set of two magnetic field shaping figure-eight coils, one a bandwidth-control figure-eight coil covering the full length of the comb structure with the direction of current and coil windings at the turn-around end of the folded-comb structure selected to aid the external field and the direction of current and coil windings at the input-output end of the folded comb structure selected to buck the external field, and the other a gain control figure-eight coil covering the central half of the comb structure with the direction of current and coil windings at the turn-around end of the folded comb stucture selected to aid the external field and the direction of current and coil windings for said current at the input-output end of the folded comb structure selected to buck the external field, and separate adjustable current sources for providing said currents to said set of figure-eight coils, one current source for each figure-eight coil.

7. The combination as defined in claim 6 wherein said traveling wave maser is comprised of a main body housing said folded-comb structure, and said figure-eight coils are wound on bobbins secured outside of said main body.

8. The combination as defined in claim 7 wherein each half of said gain control figure-eight coil is wound on a separate bobbin, and each half of said bandwidth control figure-eight is wound around a different bobbin having a gain control winding and an additional separate bobbin.

9. The combination as defined in claim 8 wherein said traveling wave maser is designed for X-band operation.

10. The combination as defined in claim 9 wherein said combination includes two separate pump frequencies for operation of said traveling wave maser in a push-push pump mode.

11. The combination as defined in claim 10 wherein said separate pump frequencies are modulated.

12. The combination as defined in claim 11 wherein said separate pump frequencies are modulated with a 100 KHz sinewave.

* * * * *